United States Patent [19]

Hong

[11] Patent Number: 5,604,675
[45] Date of Patent: Feb. 18, 1997

[54] APPARATUS AND METHOD FOR CONTROLLING EXECUTIONS OF MULTIPLE FUNCTIONS IN AN ELECTRIC HOME APPLIANCE

[75] Inventor: Kwon-pyo Hong, Suwon, Rep. of Korea

[73] Assignee: SamSung Electronics Co., Ltd., Suwon, Rep. of Korea

[21] Appl. No.: 756,804

[22] Filed: Sep. 9, 1991

[30] Foreign Application Priority Data

Sep. 12, 1990 [KR] Rep. of Korea ............. 90-14363

[51] Int. Cl.⁶ .................................. G05B 11/01
[52] U.S. Cl. ................................ 364/146; 364/140
[58] Field of Search ....................... 364/143, 145, 364/146, 188, 189; 340/825.22; 307/141, 40, 41; 360/4, 31, 55

[56] References Cited

U.S. PATENT DOCUMENTS

| | | | |
|---|---|---|---|
| 3,579,197 | 5/1971 | Stapleford | 364/138 |
| 3,819,906 | 6/1974 | Gould, Jr. | 364/146 |
| 4,001,599 | 1/1977 | Karklys | 307/141 |
| 4,193,120 | 3/1980 | Yello | 364/146 |
| 4,228,543 | 10/1980 | Jackson | 455/181 |
| 4,279,012 | 7/1981 | Beckedorff et al. | 364/146 |
| 4,293,915 | 10/1981 | Carpenter et al. | 364/493 |
| 4,345,145 | 8/1982 | Norwood | 364/189 |
| 4,371,922 | 2/1983 | Fujita et al. | 364/144 |
| 4,418,333 | 11/1983 | Schwarzbach et al. | 364/146 |
| 4,418,398 | 11/1983 | Hornung | 364/141 |
| 4,426,684 | 1/1984 | Sechet et al. | 395/425 |
| 4,475,153 | 10/1984 | Kihara et al. | 364/145 |
| 4,728,949 | 3/1988 | Platte et al. | 346/825.37 |
| 4,825,209 | 4/1989 | Sasaki et al. | 340/825.37 |
| 4,937,690 | 6/1990 | Yamashita et al. | 360/92 |
| 4,979,057 | 12/1990 | Matsumoto et al. | 360/71 |
| 4,984,512 | 1/1991 | Takahashi et al. | 364/146 |
| 5,086,385 | 2/1992 | Launey et al. | 364/188 |

OTHER PUBLICATIONS

POST, Panasonic Advertisement of MARC System from 24 Apr. 1991 edition.

*Primary Examiner*—Paul P. Gordon
*Attorney, Agent, or Firm*—Robert E. Bushnell, Esq.

[57] ABSTRACT

An apparatus for controlling continuous executions of multiple functions in an electric home appliance and method is disclosed. The apparatus comprises key input and display means for inputting continuous multiple function data desired by the user and displaying the input data and control means for storing function data supplied from the key input and display means and for controlling predetermined functions to be sequentially carried out according to the stored function data.

21 Claims, 3 Drawing Sheets

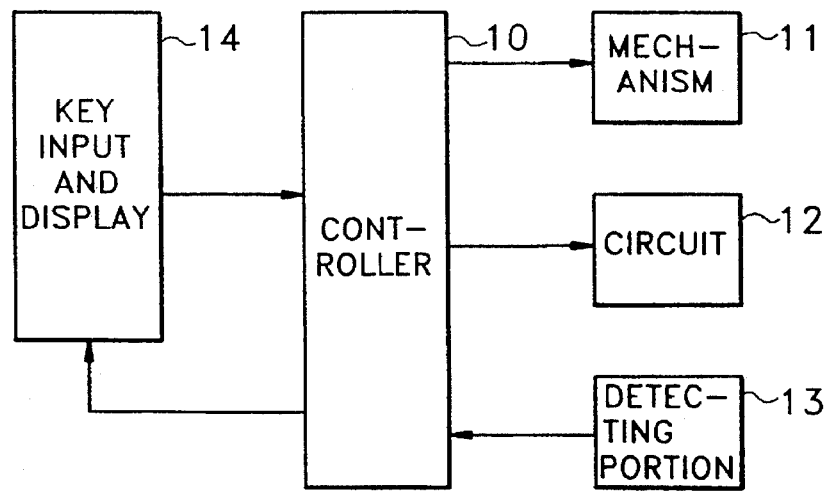
FIG. 1
FIG. 2
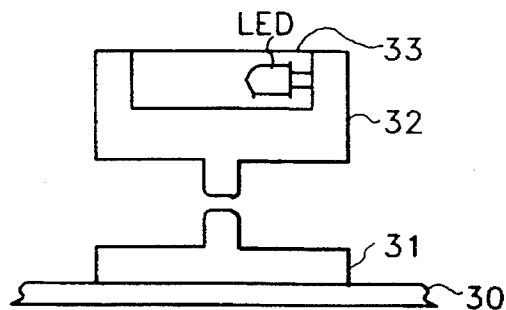
FIG. 3

APPARATUS AND METHOD FOR CONTROLLING EXECUTIONS OF MULTIPLE FUNCTIONS IN AN ELECTRIC HOME APPLIANCE

FIELD OF THE INVENTION

The present invention relates to an apparatus and a method for controlling the execution of functions of an electric home appliance having multiple functions and, more particularly, to an apparatus and a method in which executable commands for desired functions are programmed to be carried out in their order of entry.

BACKGROUND OF THE INVENTION

Recently, electric home appliances having various functions are provided with a keypad or a key matrix for inputting commands for user-designated functions. Whenever the user wishes to change the function being executed to another function, data from either the keypad or key matrix is interpreted in order to execute the corresponding functions. Owing to this, the user is burdened because the keypad or key matrix requires manual operation whenever he wishes to execute a change in the operation of a home appliance.

A known solution to the above-stated problem is disclosed in a related, copending Korean application Ser. No. 89-18746, filed Dec. 16, 1989, on behalf of this same inventor and assigned to same assignee, entitled: METHOD FOR CONTROLLING THE NEXT MODE OF VIDEO RECORDER. The technical ideas of the above-referenced application cause the user to set up functions to be executed in due sequence by the use of a keyboard or key matrix. Here each function is carried out in order, that is, first sequentially storing input commands from the keypad or key matrix into memory followed by reading and interpreting the stored commands from memory in the same sequence.

However, the above-mentioned method which executes subsequent video tape recorder modes provides no features for furnishing any information about present functions as they are programmed, so the desired executable commands are often improperly entered. In addition, as the preset functions are being sequentially executed, the user cannot ascertain which particular function of the series is in process, because no method is provided for displaying information on in-process executions.

SUMMARY OF THE INVENTION

It is accordingly the object of this invention to provide an apparatus and method for continuously executing predetermined functions for an electric home appliance having multiple functions. The sequence and type of function to be executed consecutively are precisely set by the user, and the executing states of the set functions can be identified by the user. According to one aspect of the present invention, there is provided an apparatus for controlling continuous executions of multiple functions in an electric home appliance controlled and operated according to a program in which continuous execution operations desired by a user are stored, comprising: key input and display means for inputting the predetermined multiple continuous function data desired by the user and visually displaying the input data; and control means for storing function data supplied from the key input and display means for controlling multiple functions to be carried out sequentially according to the stored function data.

According to another aspect of the present invention, there is provided a method for controlling continuous executions of multiple functions in an electric home appliance comprising the steps of checking whether or not a program order requesting the establishment of functions to be sequentially executed is input; increasing execution number by one with every occasion on which a function to be executed is designated, when the program order has been input, and storing designated function key data up to a maximum allowable execution number while sequentially turning on luminous elements for the corresponding functions in the predetermined execution number; standing until an execution key data requesting execution of functions programmed in the preceding step is input; and executing sequentially functions corresponding to the stored designation data while displaying the execution number and execution function according to execution number when an execution key is input in the preceding step.

These and other objects and advantages of the present invention will be clarified by the following detailed disclosure when read in conjunction with the accompanying drawings.

BRIEF DESCRIPTION OF THE DRAWINGS

FIG. 1 is a block diagram of an apparatus for controlling continuous executions of multiple functions according to the present invention;

FIG. 2 is a detailed diagram of input functions for the display circuitry illustrated in FIG. 1;

FIG. 3 is a side view of a key for inputting a predetermined continuous execution functions according to the present invention.

DESCRIPTION OF THE PREFERRED EMBODIMENTS

Figure 4A:
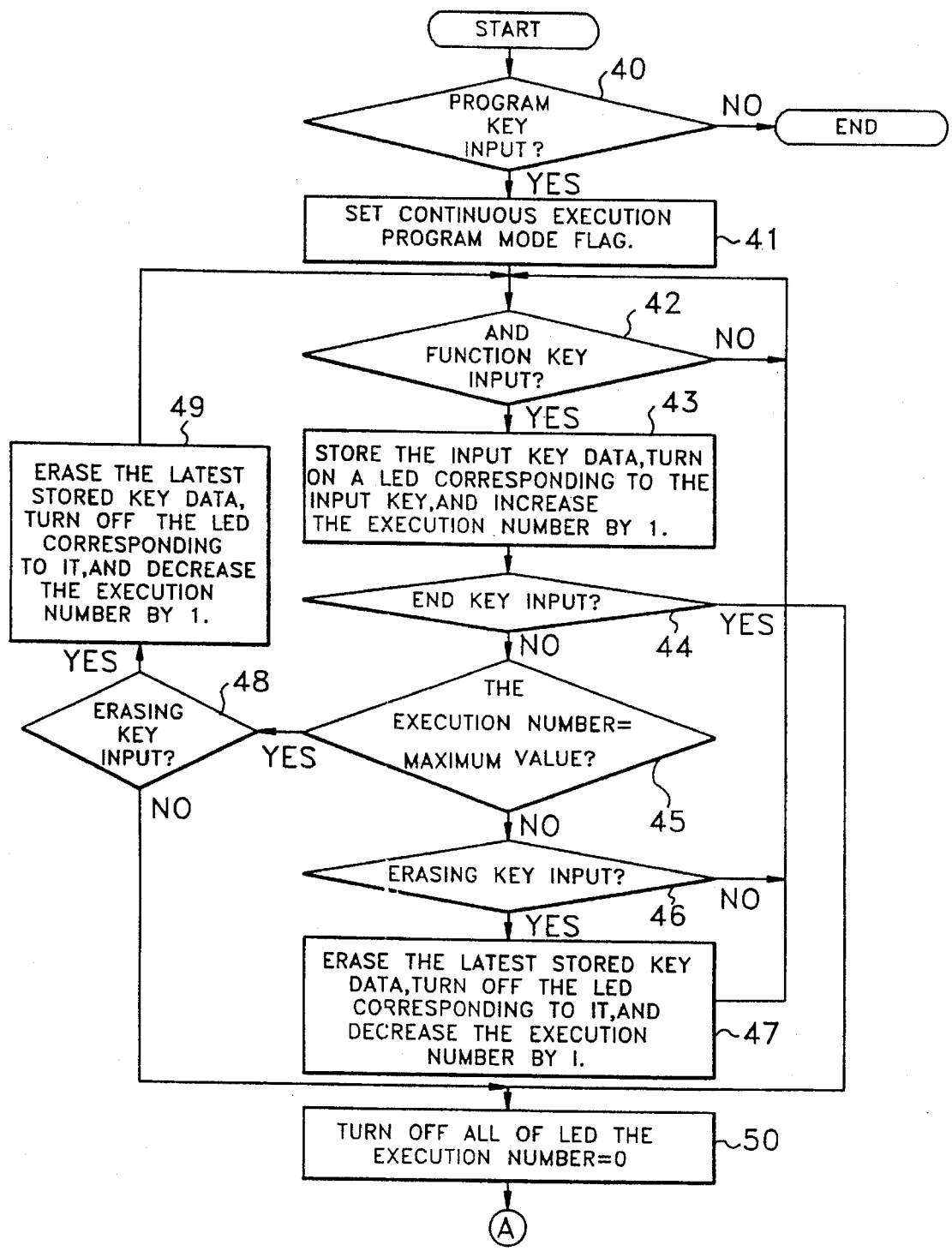
FIGS. 4A and 4B are a flowchart of one control method for executing continuously the predetermined multiple functions according to the present invention.

FIG. 1 is a block diagram of an apparatus for controlling continuous executions of multiple functions according to one embodiment of the present invention, in which the block diagram shown is applied to either a video tape recorder (VTR) or digital audio tape recorder (DAT). Here, a controller 10 is preferably a processor incorporating a central processing unit (CPU) to control whole system. A mechanism 11 drives the tape under control of the controller 10. A circuit 12 processes information under control of the controller 10 to record onto a magnetic tape, and reproduces the information recorded onto the tape. A detecting portion 13, comprising a plurality of sensors, senses operational conditions of both the mechanism part 11 and circuitry part 12, and provides input to the controller 10. A key input and display 14 consists of a key matrix and a luminous element matrix. The key input and display 14 supplies commands designated by the user to controller 10, while displaying user-selected functions and the currently operating function which controller 10 is executing.

FIG. 2 illustrates a key layout diagram of the key input and display 14 of FIG. 1.

Referring now to FIG. 2, the upper row represents executable functions, and the left column represents an execution number. Luminous elements and their corresponding function selection keys are arranged in matrix form at the intersecting points where every row and every column cross.

FIG. 3 is a structural view of the key which combines the function selection key with a luminous element, and is used in the key layout phase diagram shown in FIG. 2. Referring to FIG. 3, a reference numeral 30 denotes a print substrate, 31 and 32 are for first and second contacting plates, respectively, and 33 is a transparent film. Installed in the space between the transparent film 33 and second contacting plate 32 is a light emitting diode (LED) as luminous element.

Figure 4B:
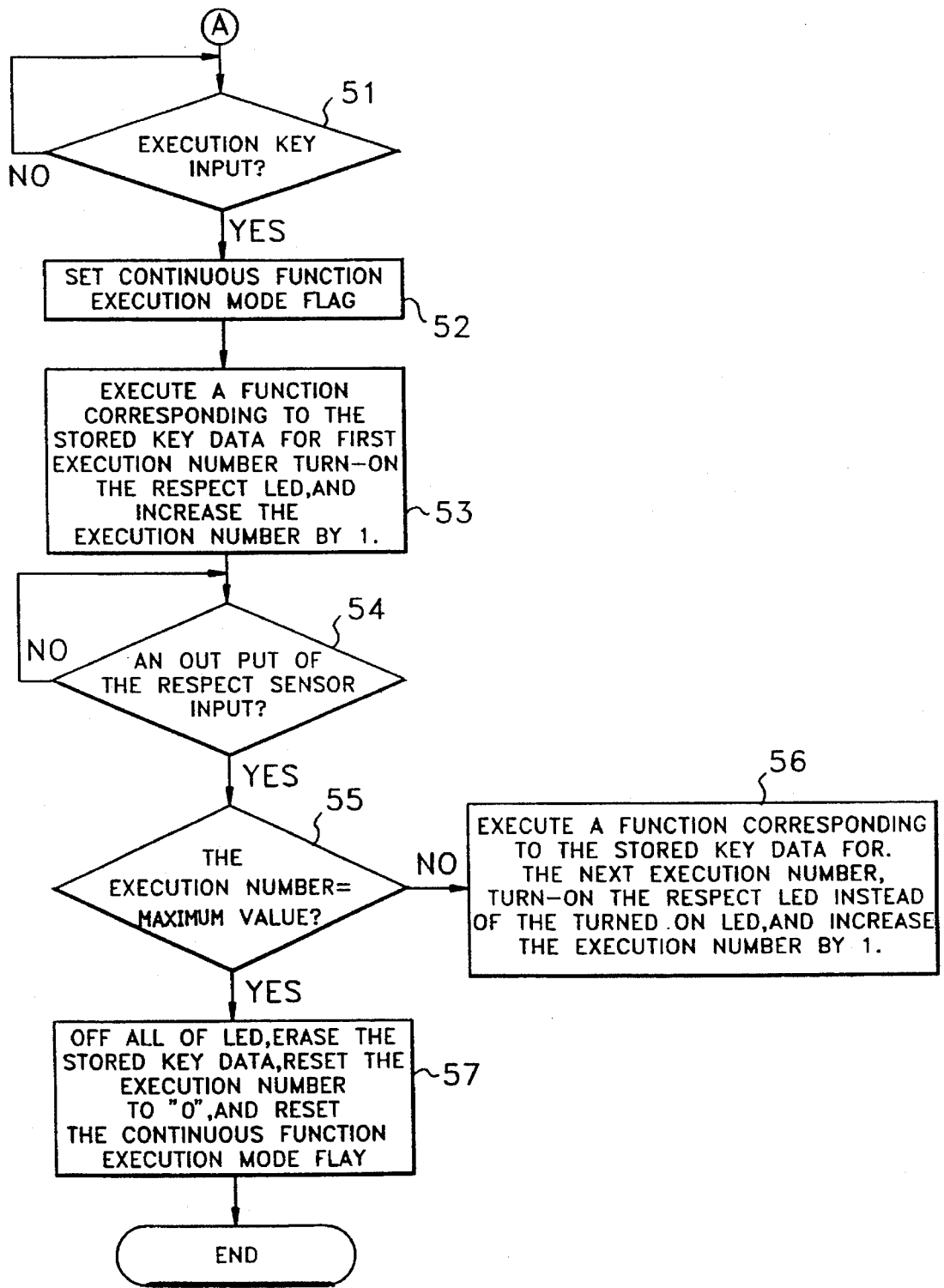

FIG. 4 is a flowchart to explain a continuous execution method according to the present invention. Step 40 corresponds to the method's first stage, while the second stage of the operation is encompassed in steps 41–50. Steps 51 and 52 are representative of the third stage. Final operations are carried out in steps 53–57. Overall procedural steps will now be given in conjunction with the circuit diagram shown in FIG. 1.

The procedure illustrated in FIG. 4 is carried out by the controller 10 shown in FIG. 1. The controller 10, carrying out functions relevant to command already designated by the user, periodically scans key input and display 14 in order to determine which program key has been input (step 40).

When a programming key has been entered in the step 40, controller 10 sets up the program mode to scan continuous execution program mode flag assigned to the controller's register (step 41).

After executing step 41, controller 10 scans the key input and display 14 and idles until function key data is received from key input and display 14 (step When a function key data is input at the step 42, controller 10 stores the input function key data in the controller's RAM, turns on a luminous element corresponding to the input function key data and situated on the first row of key input and display 14, then increases an execution number stored in its register by one (step 43).

Upon again execution of step 43, controller 10 scans key input and display 14 to determine whether or not the end key is input (step 44).

When an end key is not input at step 44, controller 10 determines whether the execution number counted in its own register is a maximum value (step 45).

When the execution number is not the maximum number in step 45, controller 10 determines whether an erasing key has been input from the key input and display 14. Then controller 10 returns to step 42 if the erasing key in not input from the key input and display 14 (step 46).

When the erasing key is input at step 46, controller 10 clears the last-stored function key data in its own RAM, turns off the luminous element corresponding to last-stored function key, subtracts one from the execution number, and then returns to step 42 (step 47).

When the execution number is the maximum value in step 45, controller 10 determines whether an easing key has been input from the key input and display 14 (step 48).

When the erasing key has been received during step 48, controller 10 erases the last-stored function key data in its own RAM, turns off the luminous element corresponding to the last entered function key in the key input and display 14, subtracts one from the execution number counted in its own register and then returns to step 42 (step 49).

In either cases of the end key has been inputted at the step 44 or the erasing key has been input at steps 46 and 48, controller 10 turns off all the luminous elements lighted up in key input and display 14, and initials the execution number counted in its own register to "0" and resets continuous execution program mode flag. (step 50)

After the execution of the step 50, controller 10 stands by until an execution key from key input and display 14 is input (step 51).

When the execution key data is entered in the step 50, controller 10 sets the continuous function execution mode flag assigned in its own register, thereby establishing the mode to be a continuous function execution (step 52).

Next, controller 10 reads and interprets the function key data to be executed first which was recorded in its own RAM, then generates control signals for the interpreted function to be supplied to mechanism 11 and circuit 12. Further, controller 10 turns on the luminous element corresponding to the first execution number pertaining to the interpreted function, and adds 1 to the execution number stored in its own register (step 53).

After execution of the step 53, controller 10 stands by until a sensing signal representing the termination of the function currently being executed is input from detecting portion 13 (step 54).

When the sensing signal representing the termination of the function currently being executed is received, the controller 10 determines whether the current execution number counted in its own register is maximum value (step 55), and if not, controller 10 reads and interprets the function key data to be executed next. Then, the controller generates control signals for the interpreted function and supplies them to mechanism 11 and circuit 12. In addition, controller 10 turns on, in lieu of currently turned on luminous element on the key input and display 14, the luminous element corresponding to the above interpreted function which is located at the next execution number to the currently turned on luminous element, next adds 1 onto the execution number counted onto its own register, and then returns to the step 53 (step 56).

When, in step 55, the execution number of the previously executed command equals the final value, controller 10 clears the function key data stored in its own RAM, resets the execution number to zero, turns off the luminous element on the key input and display 14, and resets the continuous function execution mode flag in the register in order to terminate continuous function execution mode (step 57).

As stated, the present invention provides greater convenience in usage with users by both letting a viewer make it easier to program a continuous function by way of arranging luminous elements onto key input part with keys according to both function keys and execution order and, operates them according to operation program, and making a viewer to identify more easily during continuous function execution.

Although the present invention has been described and illustrated in detail, it is clearly understood that the same is for illustration and example only and, not to be taken as a limitation. The spirit and scope of the present invention being limited only by the terms of the appended claims.

What is claimed is:

1. An apparatus for controlling continuously executions of multiple functions in an appliance controlled and operated according to a program in which continuous execution operations desired by a user are stored, the apparatus comprising:

key input and display means for enabling user selection and display of predetermined continuous multiple function data desired by said user, said function data being indicative of individual ones of a plurality of functions comprising fast-forward, play, rewind, and record; and control means for storing said function data supplied from said key input and display means, and for controlling predetermined functions to be sequentially carried out according to the stored function data.

2. An apparatus according to claim 1, wherein said key input and display means is of a matrix type.

3. An apparatus according to claim 2, wherein said key input and display means includes a key input portion for inputting a predetermined function desired by said user and a display portion for visually displaying predetermined functions.

4. An apparatus as claimed in claim 1, further comprised of said control means detecting user selection of a program mode, upon detection of the selection of the program mode, enabling user selection of a plurality of functions, sequentially storing the selected functions as said function data in a received order, and displaying the selected functions, thereafter, terminating said programming mode in response to user selection of an end program function and if a number of selected functions is a maximum number of storable functions, and then sequentially executing the selected functions upon user selection of an execution mode.

5. An apparatus as claimed in claim 4, further comprised of said control means deleting a previously entered one of said selected functions in response to user selection of an erase function.

6. An apparatus as claimed in claim 4, wherein said key input means comprises a plurality of keys set in a grid configuration, each row of a first axis of said grid configuration representing different ones of said plurality selectable functions and each row of a second axis of said grid configuration representing order of execution, wherein programming is accomplished by user selection of a one said plurality of keys in a row corresponding to a desired one of said plurality of selectable functions and a row corresponding to a desired order of execution, said function data being indicative of each selected said desired function and the corresponding said desired order of execution.

7. An apparatus as claimed in claim 1, wherein said appliance is a tape recording device.

8. An apparatus as claimed in claim 1, further comprised of said key input means comprising a plurality of keys set in a grid configuration, each row of a first axis of said grid configuration representing different ones of said predetermined functions and each row of a second axis of said grid configuration representing a different order of execution, said plurality of keys enabling programming by user selection of one of said plurality of keys in a row of said first axis corresponding to a desired one of said predetermined functions and a row of said second axis corresponding to a desired order of execution, said function data being indicative of each selected said desired function and the corresponding said desired order of execution.

9. An apparatus as claimed in claim 1, wherein said appliance is an electric home appliance.

10. An apparatus as claimed as claim 1, further comprised of said key input means comprising a plurality of keys set in a grid configuration, each row of a first axis of said grid configuration representing different ones of a plurality selectable functions and each row of a second axis of said grid configuration representing different orders of execution so that each one of said keys is indicative of a distinct combination of one of said selectable functions and one of said orders of execution, said key input means for generating said function data being indicative of selected ones of said keys.

11. An apparatus as claimed as claim 1, further comprised of said key input means indicating selected ones of said keys to inform a user of selected keys representing desired functions and the corresponding desired orders of execution.

12. A method for controlling continuous executions of multiple functions in an electric home appliances comprising the steps of:

a first step for determining whether or not a program order requesting establishment of functions to be sequentially executed is input;

a second step for increasing an execution number by one on every occasion on which a function to be executed is designated, when said program order has been input, and storing designation data corresponding to designated functions up to a maximum allowable execution number while sequentially displaying the corresponding functions in execution order;

a third step for standing-by until a request for execution of programmed functions is input after the execution of said second step; and a fourth step for executing sequentially functions corresponding to the stored designation data immediately upon termination of previously executed functions while displaying indications of corresponding execution numbers and execution functions when said request for execution is input at said third step.

13. A method as claimed in claim 12, wherein said appliance comprises a key pad and programming device having a plurality of keys set in a grid configuration and indicators corresponding to each one of said plurality of keys, each row of a first axis of said grid configuration representing different ones of said multiple functions and each row of a second axis of said grid configuration representing order of execution, said method further comprising the step of:

selecting one said plurality of keys in a row corresponding to a desired one of said multiple functions and a row corresponding to a desired order of execution for programming a corresponding one of said functions to be executed.

14. A key pad and programming device for facilitating user selection from a plurality of selectable functions to be performed sequentially by an electronic device and displaying selected ones of said plurality of selectable functions, said key pad programming device comprising:

a plurality of keys set in a grid configuration and a plurality of indicators corresponding to each one of said plurality of keys, each row of a first axis of said grid configuration representing different ones of said plurality selectable functions and each row of a second axis of said grid configuration representing an order of execution, said plurality of keys enabling selection of a one said plurality of keys in a row of said first axis corresponding to a desired one of said plurality of selectable functions and a row of said second axis corresponding to a desired order of execution so that each one of said keys is indicative of a distinct combination of one of said selectable functions and one of said orders of execution;

means for displaying said plurality of selectable functions; and control means for storing data representative of selected ones of said selectable functions, and for controlling predetermined functions to be carried out in response to said data representative of said selected ones of said selectable functions.

15. An apparatus for controlling continuously executions of multiple functions of an electric home appliance, said apparatus comprising:

key input means comprising a plurality of keys set in a grid configuration, each row of a first axis of said grid configuration representing different ones of a plurality selectable functions and each row of a second axis of said grid configuration representing different orders execution so that each one of said keys is indicative of a distinct combination of one of said selectable functions and one of said orders of execution, said key input means being for generating function data being indicative of selected ones of said keys; and control means for storing and responding to said function data by controlling predetermined functions of the home appliance according to a program providing continuous execution operations represented by said function data to be sequentially carried out according said function data.

16. An apparatus according to claim 15, wherein said key input means is further comprised of a display portion for visually displaying predetermined functions.

17. The apparatus of claim 16, further comprised of said control means determining whether a program order requesting establishment of said function data to be sequentially executed has been input, increasing an execution number by one on every occasion that a function to be executed is designated when said program order has been input, and storing designation data corresponding to designated functions up to a maximum allowable execution number while sequentially displaying the corresponding said function in the corresponding execution order, thereafter, standing-by until an execution number requesting execution of programmed functions is input, and then executing sequentially, functions corresponding to the stored designation data while displaying corresponding execution numbers and execution functions according to said execution number when an execution is input.

18. The apparatus of claim 15, further comprised of said control means determining whether a program order requesting establishment of said function data to be sequentially executed has been input, increasing an execution number by one on every occasion that a function to be executed is designated when said program order has been input, and storing designation data corresponding to designated functions up to a maximum allowable execution number while sequentially displaying the corresponding said function in the corresponding execution order, thereafter, standing-by until an execution number requesting execution of programmed functions is input, and then executing sequentially, functions corresponding to the stored designation data while displaying corresponding execution numbers and execution functions according to said execution number when an execution is input.

19. A method for programming a tape recording device, said method comprising: detecting user selection of a program mode; upon the selection of the program mode, enabling user selection of a plurality of functions, sequentially storing the selected functions in a received order, and displaying the selected functions;

deleting a previously entered one of said selected functions in response to user selection of an erase function;

terminating said programming mode in response to one of user selection of an end program function and a number of selected functions being a maximum number of storable functions; and sequentially executing the selected functions upon user selection of an execution mode immediately upon a termination of previously executed ones of said selected functions.

20. A method as claimed in claim 19, wherein step of executing said selected functions comprises recording information as binary signals.

21. A method as claimed in claim 9, wherein said step of executing said selected functions comprises recording information as binary signals.

\* \* \* \* \*